(12) United States Patent
Yoshima et al.

(10) Patent No.: US 11,631,845 B2
(45) Date of Patent: Apr. 18, 2023

(54) SECONDARY BATTERY, BATTERY PACK, AND VEHICLE

(71) Applicant: KABUSHIKI KAISHA TOSHIBA, Tokyo (JP)

(72) Inventors: Kazuomi Yoshima, Yokohama (JP); Tomoe Kusama, Tokyo (JP); Tetsuya Sasakawa, Yokohama (JP); Yasuhiro Harada, Isehara (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 107 days.

(21) Appl. No.: 17/186,707

(22) Filed: Feb. 26, 2021

(65) Prior Publication Data

US 2022/0085357 A1 Mar. 17, 2022

(30) Foreign Application Priority Data

Sep. 17, 2020 (JP) .............................. JP2020-156675

(51) Int. Cl.
*H01M 4/36* (2006.01)
*H01M 4/66* (2006.01)
*H01M 10/0565* (2010.01)
*H01M 10/42* (2006.01)
*H01M 4/02* (2006.01)

(52) U.S. Cl.
CPC ............. *H01M 4/366* (2013.01); *H01M 4/66* (2013.01); *H01M 10/0565* (2013.01); *H01M 10/425* (2013.01); *H01M 2004/027* (2013.01); *H01M 2004/028* (2013.01); *H01M 2220/20* (2013.01)

(58) Field of Classification Search
CPC ......... H01M 10/0525; H01M 10/0565; H01M 10/425; H01M 2004/027; H01M 2004/028; H01M 2220/20; H01M 2300/0025; H01M 4/366; H01M 4/66; Y02E 60/10
See application file for complete search history.

(56) References Cited

U.S. PATENT DOCUMENTS 10,408,868 B2  9/2019 Miyaji et al.
2018/0277896 A1  9/2018 Yoshima et al.
2019/0296390 A1  9/2019 Yoshima et al.

FOREIGN PATENT DOCUMENTS

CN   102368562 A  * 3/2012 ........ H01M 10/0525
JP   11-154534 A   6/1999
(Continued)

OTHER PUBLICATIONS

Machine Translation CN102368562A (Year: 2012).*

*Primary Examiner* — Victoria H Lynch
(74) *Attorney, Agent, or Firm* — Oblon, McClelland, Maier & Neustadt, L.L.P.

(57) ABSTRACT

According to one embodiment, a secondary battery includes a positive electrode including first vacancies, a negative electrode including second vacancies, and an electrolyte. The electrolyte includes a gel polymer portion and a liquid portion, and the gel polymer portion has a gel-part ratio within a range of from 20% to 80%. At least a part of the electrolyte is held in the first vacancies and the second vacancies. A first ratio r1 of the liquid portion to the gel polymer portion in the first vacancies is within a range of $0.01 \leq r1 \leq 10$. A second ratio r2 of the liquid portion to the gel polymer portion in the second vacancies is within a range of $0.01 \leq r2 \leq 10$.

7 Claims, 7 Drawing Sheets

(56) References Cited

FOREIGN PATENT DOCUMENTS

| | | |
|---|---|---|
| JP | 4653425 B2 | 3/2011 |
| JP | 2011-165553 A | 8/2011 |
| JP | 2015-190847 A | 11/2015 |
| JP | 2018-148738 A | 9/2018 |
| JP | 2019-8893 A | 1/2019 |
| WO | WO 2018/123458 A1 | 7/2018 |

* cited by examiner

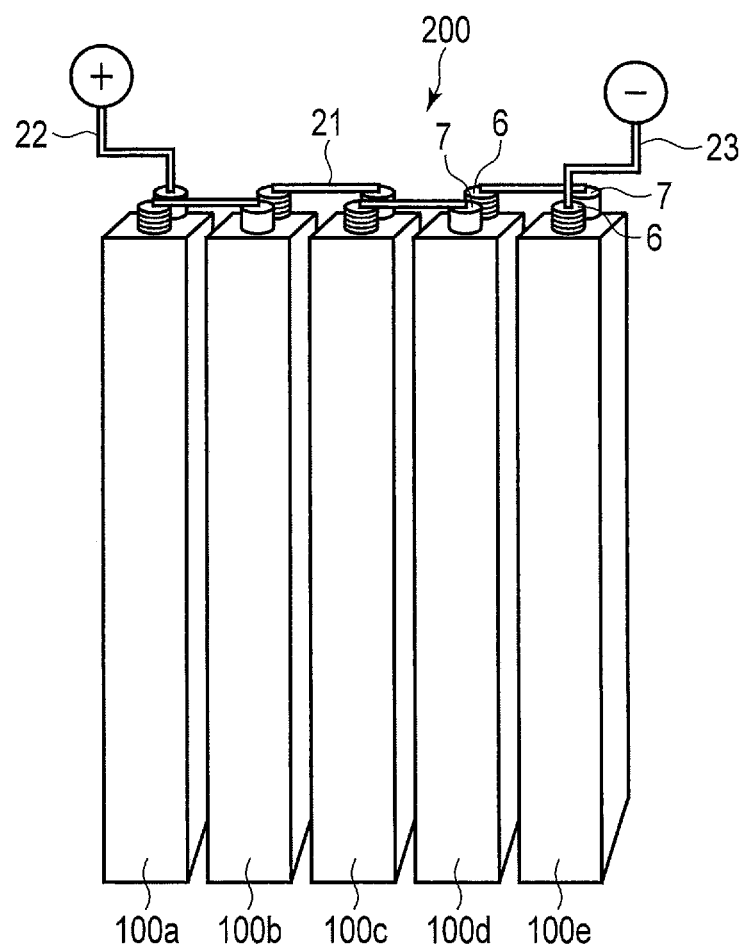
F I G. 6

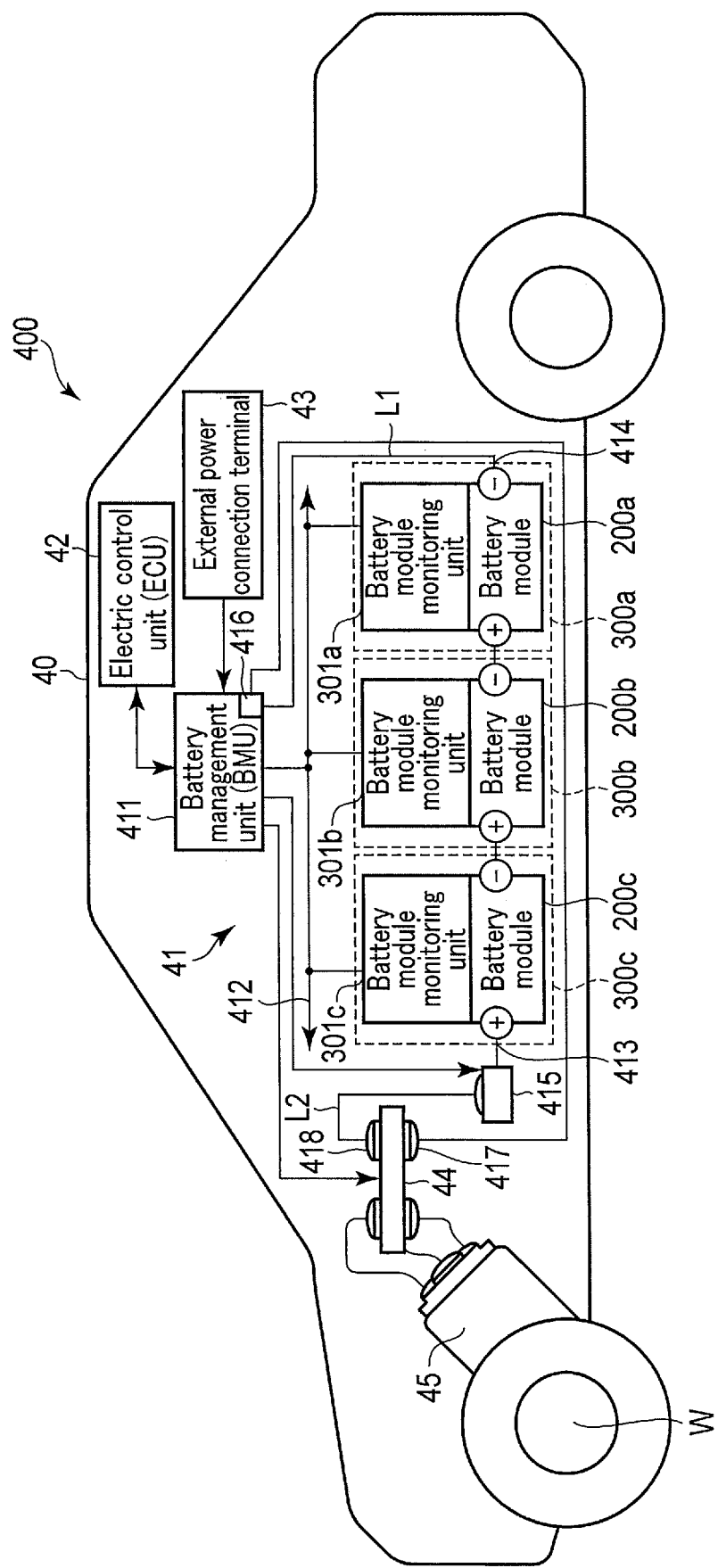
F I G. 10

SECONDARY BATTERY, BATTERY PACK, AND VEHICLE

CROSS-REFERENCE TO RELATED APPLICATIONS

This application is based upon and claims the benefit of priority from Japanese Patent Application No. 2020-156675, filed Sep. 17, 2020, the entire contents of which are incorporated herein by reference.

FIELD

Embodiments described herein relate generally to a secondary battery, a battery pack, and a vehicle.

BACKGROUND

Recently, secondary batteries such as a lithium ion secondary battery and a nonaqueous electrolyte secondary battery has been actively researched and developed as a high energy-density battery. The secondary battery is anticipated as a power source for vehicles such as hybrid automobiles and electric automobiles, or as an uninterruptible power supply for base stations for portable telephones, or the like. As an onboard battery, in particular, an all-solid lithium ion secondary battery has been vigorously researched and captured attention due to its high safety.

The all-solid lithium ion secondary battery, by virtue of using solid electrolyte, is free from ignition, in contrast to a lithium ion secondary battery using nonaqueous electrolyte. Under the present circumstances, however, the all-solid lithium ion secondary battery having high capacity has not yet been in practical use. One possible reason for this is a high interfacial resistance between the solid electrolyte and the active material. On the other hand, it is known that a gel electrolyte, which forms an interface with relative ease and is thermally safer than a liquid nonaqueous electrolyte, has been coming into practical use.

BRIEF DESCRIPTION OF THE DRAWINGS

FIG. 6 is a perspective view schematically showing an example of a battery module according to an embodiment;

FIG. 10 is a diagram schematically showing an example of a control system related to an electric system in the vehicle according to an embodiment.

DETAILED DESCRIPTION

Figure 1:
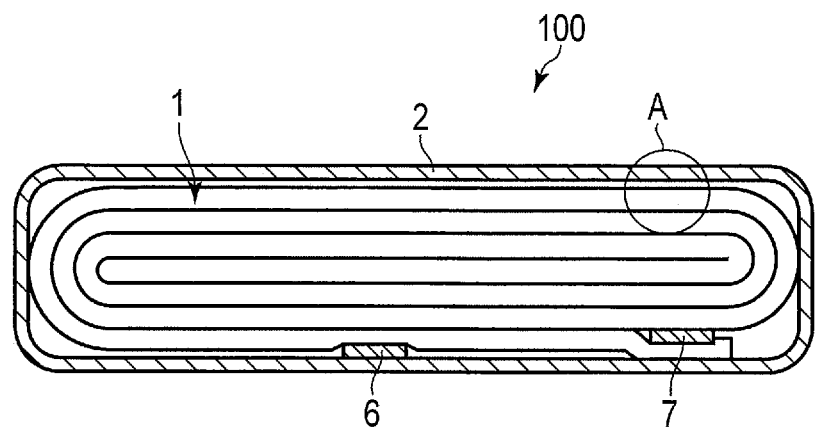
FIG. 1 is a cross-sectional view schematically showing an example of a secondary battery according to an embodiment.

According to one embodiment, provided is a secondary battery including a positive electrode, a negative electrode, and an electrolyte. The positive electrode includes a positive electrode current collector, and a positive electrode active material-containing layer provided on the positive electrode current collector and having first vacancies. The negative electrode includes a negative electrode current collector, and a negative electrode active material-containing layer provided on the negative electrode current collector and having second vacancies. The electrolyte includes a gel polymer portion and a liquid portion, and the gel polymer portion has a gel-part ratio within a range of from 20% to 80%. At least apart of the electrolyte is held in the first vacancies of the positive electrode active material-containing layer and the second vacancies of the negative electrode active material-containing layer. A first ratio r1 of a proportion of the liquid portion to a proportion of the gel polymer portion of the electrolyte in the first vacancies is within a range of $0.01 \leq r1 \leq 10$. A second ratio r2 of a proportion of the liquid portion to a proportion of the gel polymer portion of the electrolyte in the second vacancies is within a range of $0.01 \leq r2 \leq 10$.

According to another embodiment, provided is a battery pack including the secondary battery according to the above embodiment.

According to a further other embodiment, provided is a vehicle including the battery pack according to the above embodiment.

In secondary batteries employing a nonaqueous electrolyte containing a nonaqueous solvent, including a lithium ion secondary battery employing a nonaqueous electrolyte, oxidative decomposition of the nonaqueous solvent on the positive electrode surface may occur. In addition, protons and water stemming from the oxidative decomposition on the positive electrode surface may become reduced on the negative electrode surface to generate gas. Resulting from these side reactions, the battery performance may be deteriorated and the safety may be lowered as charge and discharge are undergone. Further, such side reactions are noticeable particularly under a high temperature environment and are factors in keeping the batteries from being used at elevated temperatures.

Gelling the electrolytic solution can reduce the reactivity at the positive electrode surface as well as inhibit the diffusion of resultant products from the reaction at the positive electrode and prevent substances from being transported to the negative electrode. Hence, use of the gel electrolyte can prevent the above-described side reactions, and thus can improve the life performance and/or the safety.

However, the gel electrolyte has a lower ion conductivity as compared to the liquid nonaqueous electrolyte. Use of the gel electrolyte thus may deteriorate the input-output performance of the secondary battery.

Hereinafter, embodiments will be described with reference to the drawings. In the following description, the same reference signs are applied throughout all drawings to components demonstrating the same or similar function, and overlapping explanations are omitted. Each drawing is a schematic view for explaining the embodiment and promoting understanding thereof; though there may be differences in shape, size and ratio from those in an actual device, such specifics can be appropriately changed in design taking the following explanations and known technology into consideration.

[First Embodiment]

A secondary battery according to a first embodiment includes a positive electrode, a negative electrode, and an electrolyte. The positive electrode includes a positive electrode current collector, and a positive electrode active material-containing layer provided on the positive electrode current collector. The positive electrode active material-containing layer has first vacancies. The negative electrode includes a negative electrode current collector, and a negative electrode active material-containing layer provided on the negative electrode current collector. The negative electrode active material-containing layer has second vacancies. The electrolyte includes a gel polymer portion and a liquid portion. A gel-part ratio of the gel polymer portion is within a range of from 20% to 80%. At least a part of the electrolyte is held in the first vacancies of the positive electrode active material-containing layer and the second vacancies of the negative electrode active material-containing layer. A first ratio r1 of a proportion of the liquid portion to a proportion of the gel polymer portion of the electrolyte in the first vacancies is within a range of $0.01 \leq r1 \leq 10$. A second ratio r2 of a proportion of the liquid portion to a proportion of the gel polymer portion of the electrolyte in the second vacancies is within a range of $0.01 \leq r2 \leq 10$.

The secondary battery according to the first embodiment may further include a separator provided between the positive electrode and the negative electrode. The negative electrode, the positive electrode, and the separator may configure an electrode group. The electrolyte may be held also in the separator. That is, the electrolyte may be held in the electrode group.

The secondary battery according to the first embodiment may further include a container member that houses the electrode group and the electrolyte.

Moreover, the secondary battery according to the first embodiment may further include a negative electrode terminal electrically connected to the negative electrode and a positive electrode terminal electrically connected to the positive electrode.

The secondary battery according to the second embodiment may be, for example, a lithium secondary battery. The secondary battery also includes nonaqueous electrolyte secondary batteries containing nonaqueous electrolyte(s).

The electrolyte included in the secondary battery includes the gel polymer portion and the liquid portion. The gel polymer portion includes a gel nonaqueous electrolyte. The gel polymer portion of the electrolyte may be referred to as a gel electrolyte. The liquid portion includes, for example, a liquid nonaqueous electrolyte described later. The liquid portion of the electrolyte may be referred to as an electrolytic solution. With the secondary battery including such an electrolyte, an effect where side reactions at the positive electrode and the negative electrode are prevented due to the gel polymer portion is attained, while at the same time, an excellent lithium ion conductivity due to the liquid portion is attained.

As described later, the gel nonaqueous electrolyte as the gel polymer portion is prepared by, for example, obtaining a composite of a liquid nonaqueous electrolyte and a polymeric material. The gel polymer portion includes a portion that is a gel formed of cross-linked polymeric material, and a portion that is an electrolytic solution. The ratio of the portion within the gel polymer portion that is the gel, namely, a gel-part ratio is within a range of from 20% to 80%. When the gel-part ratio of the gel polymer portion is 20% or greater, the effect of preventing side reactions at the positive electrode can be attained, which in turn can reduce reactants that cause side reactions at the negative electrode, whereby the effect of preventing side reactions at the negative electrode can be attained, as well. Accordingly, with the gel-part ratio being 20% or greater, the life performance and high-temperature durability of the secondary battery can be enhanced. When the gel-part ratio is 80% or less, an increase in electrical resistance in the gel polymer portion can be suppressed, and the diffusion of lithium ions in the gel polymer portion will not be inhibited. Accordingly, with the gel-part ratio being 80% or less, the input-output performance of the secondary battery can be maintained at a high level.

In addition, with the gel polymer portion having a gel-part ratio of 20% or greater, easy distinction can be made between a region configured of the gel polymer portion and a region configured of the liquid portion in the electrolyte. The distribution of the gel polymer portion and the liquid portion in the electrode group thus can be adjusted.

For example, in the positive electrode active material-containing layer, it is preferable for the amount of liquid portion of the electrolyte on the side of a first interface between the positive electrode active material-containing layer and the positive electrode current collector to be greater than the amount of liquid portion on the side of the surface of the positive electrode active material-containing layer. Likewise, in the negative electrode active material-containing layer, it is preferable for the amount of liquid portion of the electrolyte on the side of a second interface between the negative electrode active material-containing layer and the negative electrode current collector to be greater than the amount of liquid portion on the side of the surface of the negative electrode active material-containing layer. In other words, it is preferable for each of the positive electrode and the negative electrode to have more of the liquid portion of the electrolyte in vicinity of their respective current collectors and more of the gel polymer portion at their respective electrode active material surfaces (electrode surfaces). Such distribution can be expressed as being an uneven distribution with more gel polymer portion on the electrode surfaces than inside the electrodes. By virtue of the electrolyte being distributed in such a manner, the electrical resistance inside the electrode on the current collector side can be suppressed at a low level, while diffusion of possible reactants for side reactions can be suppressed at the electrode surface. For the latter, to be more specific, at the positive electrode surface, reactants generated by side reactions can be inhibited from moving to the negative electrode, and at the negative electrode surface, arrival of the reactants can be suppressed. Thus, with such distribution, life performance of the secondary battery can be improved, while maintaining a high level of output performance.

Here, when a half of the positive electrode active material-containing layer on the first interface side is compared with the other half in a thickness direction intersecting the first interface, the positive electrode active material-containing layer may be in a state where there is more of the liquid portion of the electrolyte included in the former. Likewise, when a half of the negative electrode active material-containing layer on the second interface side is compared with the other half in a thickness direction intersecting the second interface, the negative electrode active material-containing layer may be in a state where there is more of the liquid portion of the electrolyte included in the former.

A ratio of a proportion of the first vacancies of the positive electrode active material-containing layer filled with the liquid portion of the electrolyte to a proportion of the first vacancies filled with the gel polymer portion is defined as the first ratio r1 (r1=[proportion of liquid portion in first vacancies/proportion of gel polymer portion in first vacancies]). The first ratio r1 is within a range of 0.01≤r1≤10. By virtue of a value of the first ratio r1 falling within the above range, the secondary battery can demonstrate favorable cycling performance and output performance. This is because when the value of the first ratio r1 falls within the above range, a sufficient lithium-ion diffusion within the positive electrode active material-containing layer can be attained while having the reactivity at the positive electrode suppressed. The first ratio r1 is preferably within a range of 0.1≤r1≤1.

A ratio of a proportion of the second vacancies of the negative electrode active material-containing layer filled with the liquid portion of the electrolyte to a proportion of the second vacancies filled with the gel polymer portion is defined as the second ratio r2 (r2=[proportion of liquid portion in second vacancies/proportion of gel polymer portion in second vacancies]). The second ratio r2 is within a range of 0.01≤r2≤10. By virtue of a value the second ratio r2 falling within the above range, the above secondary battery can demonstrate favorable cycling performance and output performance. The second ratio r2 is preferably within a range of 0.1≤r2≤1.

The first ratio r1 and the second ratio r2 preferably satisfy the relationship of r1≤r2. That is, a proportion of the electrolytic solution included in the positive electrode is preferably lower than a proportion of the electrolytic solution included in the negative electrode. In other words, the positive electrode preferably includes more gel polymer portion than the negative electrode. As described above, suppression of the side reactions at the positive electrode also leads to the suppression of the side reactions at the negative electrode. Thus, by having the gel polymer portion proportion be higher in the positive electrode while having the liquid portion proportion be higher in the negative electrode, side reactions in the battery can be effectively suppressed while simultaneously enhancing the input-output performance.

All of the first vacancies included in the positive electrode active material-containing layer are preferably filled with the gel polymer portion or liquid portion of the electrolyte. Likewise, all of the second vacancies included in the negative electrode active material-containing layer are preferably filled with the gel polymer portion or liquid portion of the electrolyte. By having the active material-containing layer of each electrode impregnated in its entirety with the electrolyte in such a manner, portions within the electrode that do not contribute to charge and discharge can be reduced.

Hereinafter, the negative electrode, positive electrode, electrolyte, separator, container member, negative electrode terminal, and positive electrode terminal will be described in detail.

1) Negative Electrode

The negative electrode includes a negative electrode current collector and a negative electrode active material-containing layer provided on the negative electrode current collector. The negative electrode active material-containing layer may be formed on one surface or both of reverse surfaces of the negative electrode current collector. The negative electrode active material-containing layer includes a negative electrode active material, and may optionally include an electro-conductive agent and a binder.

The negative electrode active material-containing layer may include one species of negative electrode active material alone, or include two or more species of negative electrode active material.

Examples of the negative electrode active material include lithium titanate having a ramsdellite structure (e.g., $Li_{2+y}Ti_3O_7$, 0≤y≤3), lithium titanate having a spinel structure (e.g., $Li_{4+x}Ti_5O_{12}$, 0≤x≤3), monoclinic titanium dioxide ($TiO_2$), anatase titanium dioxide, rutile titanium dioxide, a hollandite titanium composite oxide, an orthorhombic titanium composite oxide, and monoclinic niobium-titanium composite oxide.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb and K. M(II) is at least one selected from the group consisting of Zr, Sn, V, Nb, Ta, Mo, W, Y, Fe, Co, Cr, Mn, Ni and Al. The respective subscripts in the composition formula are specified as follows: 0≤a≤6, 0≤b<2, 0≤c<6, 0≤d<6, and −0.5≤σ≤0.5. Specific examples of the orthorhombic titanium-containing composite oxide include $Li_{2+a}Na_2Ti_6O_{14}$ (0≤a≤6).

Examples of the monoclinic niobium-titanium composite oxide include a compound represented by $Li_xTi_{1-y}M1_yNb_{2-z}M2_zO_{7+\delta}$. Here, M1 is at least one selected from the group consisting of Zr, Si, and Sn. M2 is at least one selected from the group consisting of V, Ta, and Bi. The respective subscripts in the composition formula are specified as follows: 0≤x≤5, 0≤y<1, 0≤z<2, and −0.3≤δ≤0.3. Specific examples of the monoclinic niobium-titanium composite oxide include $Li_xNb_2TiO_7$ (0≤x≤5).

Another example of the monoclinic niobium-titanium composite oxide is a compound represented by $Li_xTi_{1-y}M3_{y+z}Nb_{2-z}O_{7-\delta}$. Here, M3 is at least one selected from the group consisting of Mg, Fe, Ni, Co, W, Ta, and Mo. The respective subscripts in the composition formula are specified as follows: 0≤x<5, 0≤y<1, 0≤z<2, and −0.3≤δ≤0.3.

The electro-conductive agent is added to improve current collection performance and to suppress contact resistance between the active material and the current collector. Examples of the electro-conductive agent include carbonaceous substances such as vapor grown carbon fiber (VGCF), carbon blacks such as acetylene black, graphite, carbon nanofiber, and carbon nanotubes. One of these may be used as the electro-conductive agent, or two or more may be used in combination as the electro-conductive agent. Alternatively, instead of using an electro-conductive agent, a carbon coating or an electro-conductive inorganic material coating may be applied to the surface of the active material particle.

The binder is added to fill gaps among the dispersed active material and also to bind the active material with the current collector. Examples of the binder include polytetrafluoroethylene (PTFE), polyvinylidene fluoride (PVdF), fluoro-rubber, styrene-butadiene rubber (SBR), polyacrylate compounds, imide compounds, carboxymethyl cellulose (CMC), and salts of CMC. One of these may be used as the binder, or alternatively, two or more may be used in combination as the binder.

In the negative electrode active material-containing layer, the negative electrode active material, electro-conductive agent, and binder are preferably blended in proportions of 68% by mass to 96% by mass, 2% by mass to 30% by mass, and 2% by mass to 30% by mass, respectively. When the amount of electro-conductive agent is 2% by mass or more, the current collection performance of the negative electrode active material-containing layer can be improved. When the amount of binder is 2% by mass or more, binding between the negative electrode active material-containing layer and negative electrode current collector is sufficient, and excellent cycling performances can be expected. On the other hand, an amount of each of the electro-conductive agent and binder is preferably 30% by mass or less, in view of increasing the capacity.

There may be used for the negative electrode current collector, a material which is electrochemically stable at the potential at which lithium (Li) is inserted into and extracted from the active material. For example, the negative electrode current collector is preferably made of copper, nickel, stainless steel, aluminum, or an aluminum alloy including one or more selected from the group consisting of Mg, Ti, Zn, Mn, Fe, Cu, and Si. The thickness of the negative electrode current collector is preferably from 5 µm to 20 µm. The negative electrode current collector having such a thickness can maintain balance between the strength and weight reduction of the electrode.

The negative electrode current collector may include a portion where the negative electrode active material-containing layer is not formed on a surface thereof. This portion may serve as a negative electrode current collecting tab.

The density of the negative electrode active material-containing layer (excluding the current collector) is preferably from 1.8 g/cm$^3$ to 2.8 g/cm$^3$. The negative electrode, in which the density of the negative electrode active material-containing layer is within this range, is excellent in energy density and ability to hold the electrolyte. The density of the negative electrode active material-containing layer is more preferably from 2.1 g/cm$^3$ to 2.6 g/cm$^3$.

The negative electrode may be fabricated by the following method, for example. First, negative electrode active material, electro-conductive agent, and binder are suspended in a solvent to prepare a slurry. The slurry is applied onto one surface or both of reverse surfaces of a negative electrode current collector. Next, the applied slurry is dried to form a stack of negative electrode active material-containing layer(s) and current collector. Then, the stack is subjected to pressing. The negative electrode can be fabricated in this manner.

Alternatively, the negative electrode may also be produced by the following method. First, negative active material, electro-conductive agent, and binder are mixed to obtain a mixture. Next, the mixture is formed into pellets. Then the negative electrode can be obtained by arranging the pellets on the current collector.

2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may singly include one species of compound as the positive electrode active material, or alternatively, include two or more species of compounds in combination. Examples of the oxide and sulfide include compounds capable of having Li and Li ions be inserted and extracted.

Examples of such compounds include manganese dioxide ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y\leq1$, $Li_xCoPO_4$; $0<x\leq1$), iron sulfates ($Fe_2(SO_4)_3$), vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these compounds as positive electrode active material.

When an ambient temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with ambient temperature molten salts, cycle life can be improved. Details regarding the ambient temperature molten salt are described later.

The primary particle diameter of the positive electrode active material is preferably from 100 nm to 1 µm. The positive electrode active material having a primary particle size of 100 nm or more is easy to handle during industrial production. In the positive electrode active material having a primary particle size of 1 µm or less, in-solid diffusion of lithium ions can proceed smoothly.

The specific surface area of the positive electrode active material is preferably from 0.1 m$^2$/g to 10 m$^2$/g. The positive electrode active material having a specific surface area of 0.1 m$^2$/g or more can secure sufficient sites for inserting and extracting Li ions. The positive electrode active material having a specific surface area of 10 m$^2$/g or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluororubber, polyacrylate compounds, imide compounds, carboxymethyl cellulose (CMC), and salts of CMC. One of these may be used as the binder, or alternatively, two or more may be used in combination as the binder.

The electro-conductive agent is added to improve current collection performance and to suppress the contact resistance between the positive electrode active material and the positive electrode current collector. Examples of electro-conductive agent include carbonaceous substances such as vapor grown carbon fiber (VGCF), carbon black such as acetylene black, and graphite. One of these may be used as the electro-conductive agent, or alternatively, two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. By setting the amount of the electro-conductive agent to 15% by mass or less, the proportion of electro-conductive agent that contacts the electrolyte can be made low. When this proportion is low, decomposition of electrolyte can be reduced during storage under high temperatures.

The positive electrode current collector is preferably an aluminum foil, or an aluminum alloy foil containing one or more selected from the group consisting of Mg, Ti, Zn, Ni, Cr, Mn, Fe, Cu, and Si.

The thickness of the aluminum foil or aluminum alloy foil is preferably from 5 μm to 20 μm, and more preferably 15 μm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface of thereof. This portion may serve as a positive electrode current collecting tab.

The positive electrode may be produced, for example, by a method similar to that for the negative electrode, using the positive electrode active material in place of the negative electrode active material.

3) Electrolyte

The electrolyte includes the gel polymer portion and the liquid portion. The liquid portion includes, for example, a liquid nonaqueous electrolyte prepared by dissolving an electrolyte salt as solute in an organic solvent. The gel polymer portion includes, for example, a gel nonaqueous electrolyte prepared by obtaining a composite of the liquid nonaqueous electrolyte and a polymeric material.

The concentration of electrolyte salt in the electrolyte is preferably from 0.5 mol/L to 2.5 mol/L.

Examples of the electrolyte salt include lithium salts such as lithium perchlorate ($LiClO_4$) lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), and vinylene carbonate (VC); linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2-MeTHF), and dioxolane (DOX); linear ethers such as dimethoxy ethane (DME) and diethoxy ethane (DEE); γ-butyrolactone (GBL), acetonitrile (AN), and sulfolane (SL). These organic solvents may be used singularly or as a mixed solvent.

Examples of the polymeric material that may be used for preparing the gel nonaqueous electrolyte (the gel polymer portion) include polyvinylidene fluoride (PVdF), polyacrylonitrile (PAN), polyethylene oxide (PEO), polymethyl methacrylate (PMMA) and mixtures thereof. One species of the polymeric material may be used alone, or multiple species may be mixed in mixture.

In addition, together with the liquid nonaqueous electrolyte (the liquid portion) and gel nonaqueous electrolyte (the gel polymer portion), an ambient temperature molten salt (ionic melt) including lithium ions, a polymer solid electrolyte, an inorganic solid electrolyte, or the like may further be used as the nonaqueous electrolyte.

The ambient temperature molten salt (ionic melt) indicates compounds among organic salts made of combinations of organic cations and anions, which are able to exist in a liquid state at ambient temperature (15° C. to 25° C.). The ambient temperature molten salt includes an ambient temperature molten salt which exists alone as a liquid, an ambient temperature molten salt which becomes a liquid upon mixing with an electrolyte salt, an ambient temperature molten salt which becomes a liquid when dissolved in an organic solvent, and mixtures thereof. In general, the melting point of the ambient temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

4) Separator

The separator may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred. This is because such a porous film melts at a fixed temperature and thus able to shut off current.

5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal container is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylindrical, coin-shaped, or button-shaped. The container member may be appropriately selected depending on battery size and use of the battery.

6) Negative Electrode Terminal

The negative electrode terminal may be made of a material that is electrochemically stable at the Li insertion/extraction potential of the aforementioned negative electrode active material, and having electrical conductivity. Specific examples of the material for the negative electrode terminal include copper, nickel, stainless steel, aluminum, and aluminum alloy containing at least one selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce contact resistance between the negative electrode terminal and the negative electrode current collector.

7) Positive Electrode Terminal

The positive electrode terminal may be made of a material that is electrically stable in the potential range of 3 V to 4.5 V (vs. $Li/Li^+$) relative to the oxidation-reduction potential of lithium, and having electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance between the positive electrode terminal and the positive electrode current collector.

Next, the secondary battery according to the first embodiment will be more concretely described with reference to the drawings.

Figure 2:
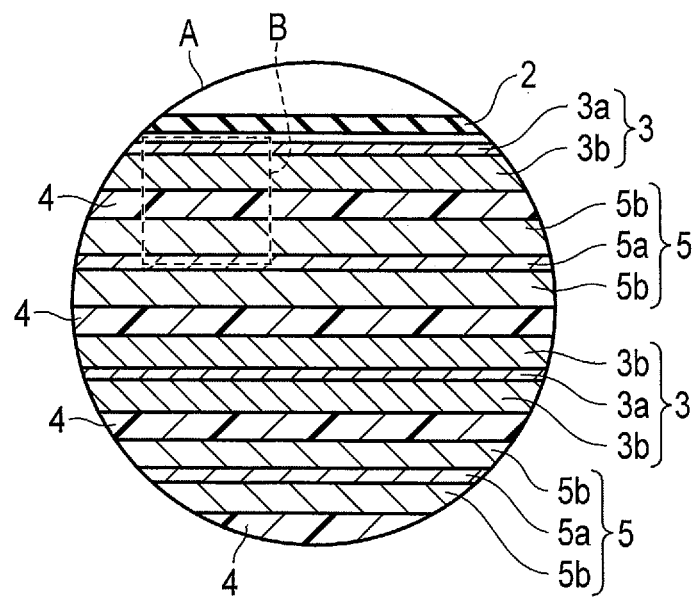
FIG. 2 is an enlarged cross-sectional view of section A of the secondary battery shown in FIG. 1.
Figure 3:
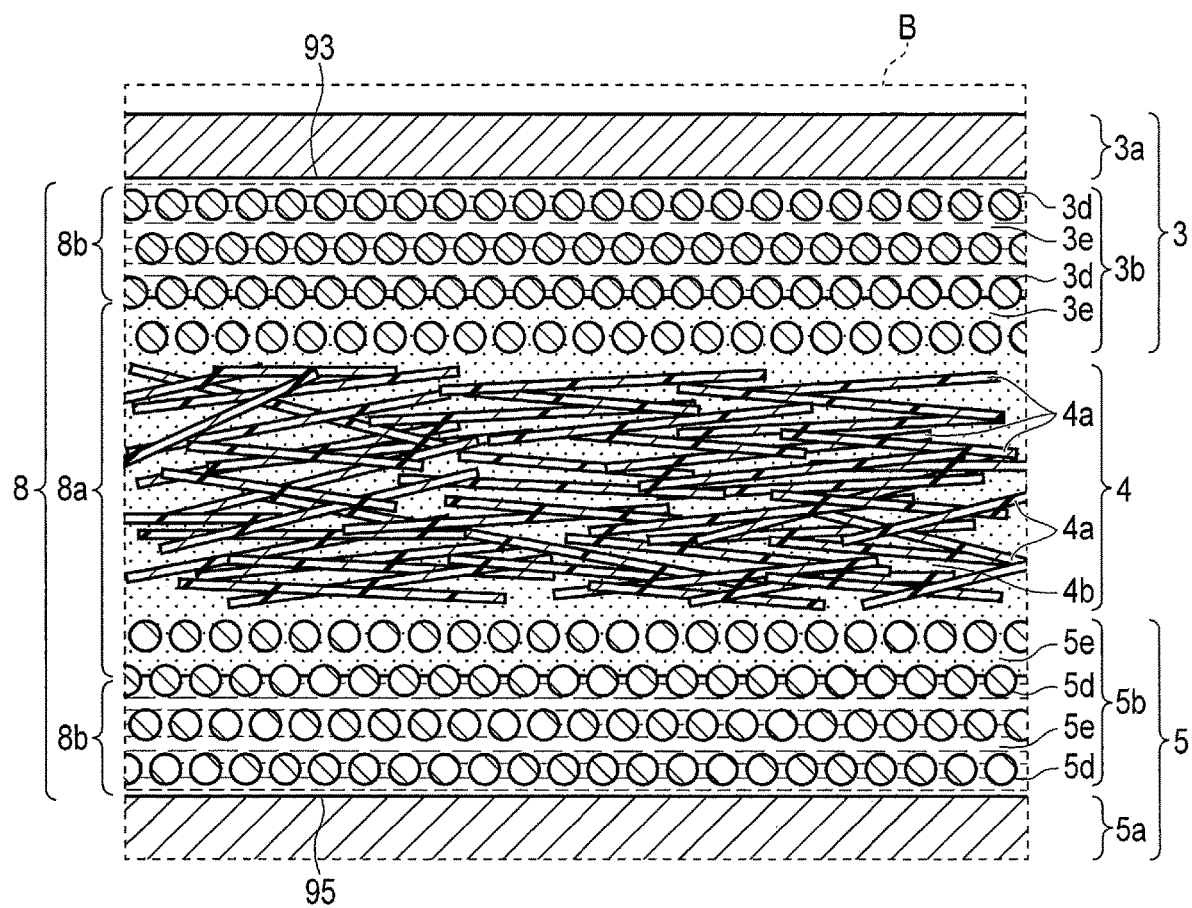
FIG. 3 is an enlarged cross-sectional view of section B shown in FIG. 2.

FIG. 1 is a cross-sectional view schematically showing an example of a secondary battery according to the first embodiment. FIG. 2 is an enlarged cross-sectional view of section A of the secondary battery shown in FIG. 1. FIG. 3 is a further enlarged cross-sectional view of section B shown in FIG. 2.

The secondary battery 100 shown in FIGS. 1 to 3 includes a bag-shaped container member 2 shown in FIGS. 1 and 2, an electrode group 1 shown in FIG. 1, and an electrolyte 8 shown in FIG. 3. The electrode group 1 and the electrolyte 8 are housed in the bag-shaped container member 2. The electrolyte 8 is held in the electrode group 1.

The bag-shaped container member 2 is made of a laminate film including two resin layers and a metal layer sandwiched between the resin layers.

As shown in FIG. 1, the electrode group 1 is a wound electrode group in a flat form. The wound electrode group 1 in a flat form includes a negative electrode 3, a separator 4, and a positive electrode 5, as shown in FIG. 2. The separator 4 is sandwiched between the negative electrode 3 and the positive electrode 5.

The negative electrode 3 includes a negative electrode current collector 3a and negative electrode active material-containing layers 3b. At the portion of the negative electrode 3 positioned outermost among the wound electrode group 1, the negative electrode active material-containing layer 3b is formed only on an inner surface of the negative electrode current collector 3a, as shown in FIG. 2. For the other portions of the negative electrode 3, negative electrode active material-containing layers 3b are formed on both of reverse surfaces of the negative electrode current collector 3a. As shown in FIG. 3, the negative electrode active material-containing layer 3b includes negative electrode active materials 3d. As mentioned above, the negative electrode active material-containing layers 3b may include materials other than the negative electrode active materials 3d, such as the binder and electro-conductive agent; however, depiction of materials other than the negative electrode active materials 3d is omitted, for sake of simplification. In the negative electrode active material-containing layers 3b, second vacancies 3e are included between the negative electrode active materials 3d, binder, and electro-conductive agent.

The positive electrode 5 includes a positive electrode current collector 5a and positive electrode active material-containing layers 5b formed on both of reverse surfaces of the positive electrode current collector 5a. As shown in FIG. 3, the positive electrode active material-containing layer 5b includes positive electrode active materials 5d. As mentioned above, the positive electrode active material-containing layers 5b may include materials other than the positive electrode active materials 5d, such as the binder and electro-conductive agent; however, depiction of materials other than the positive electrode active materials 5d is omitted, for sake of simplification. In the positive electrode active material-containing layers 5b, first vacancies 5e are included between the positive electrode active materials 5d, binder, and electro-conductive agent.

The exemplified separator 4 is a nonwoven fabric made of synthetic resin fibers 4a. The separator 4 includes third vacancies 4b between the synthetic resin fibers 4a.

The electrolyte 8 includes a gel polymer portion 8a and a liquid portion 8b. The gel polymer portion 8a is partially held in a part of the first vacancies 5e in the positive electrode active material-containing layers 5b of the positive electrode 5, and partially held in a part of the second vacancies 3e in the negative electrode active material-containing layers 3b of the negative electrode 3, and partially held in the third vacancies 4b in the separator 4. The liquid portion 8b is held in a part of the first vacancies 5e in the positive electrode active material-containing layers 5b and a part of the second vacancies 3e in the negative electrode active material-containing layers 3b. That is, in the positive electrode active material-containing layers 5b of the positive electrode 5, one portion of the first vacancies 5e is filled with the gel polymer portion 8a of the electrolyte 8, and another portion of the first vacancies 5e holds the liquid portion 8b. In the positive electrode active material-containing layer 5b, the side of a first interface 95 between the positive electrode active material-containing layer 5b and the positive electrode current collector 5a has more of the liquid portion 8b in comparison to the side of the separator 4. Likewise, in the negative electrode active material-containing layer 3b of the negative electrode 3, one portion of the second vacancies 3e is filled with the gel polymer portion 8a of the electrolyte 8, and another portion of the second vacancies 3e holds the liquid portion 8b. In the negative electrode active material-containing layer 3b, the side of a second interface 93 between the negative electrode active material-containing layer 3b and the negative electrode current collector 3a has more of the liquid portion 8b in comparison to the side of the separator 4.

As shown in FIG. 1, a negative electrode terminal 6 and positive electrode terminal 7 are positioned in vicinity of the outer peripheral end of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Figure 4:
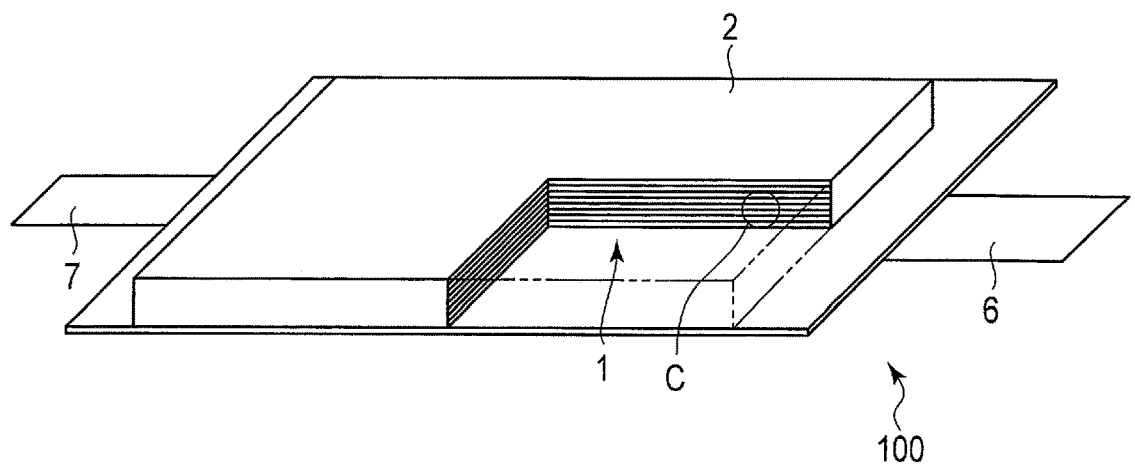
FIG. 4 is a partially cut-out perspective view schematically showing another example of the secondary battery according to the embodiment.
Figure 5:
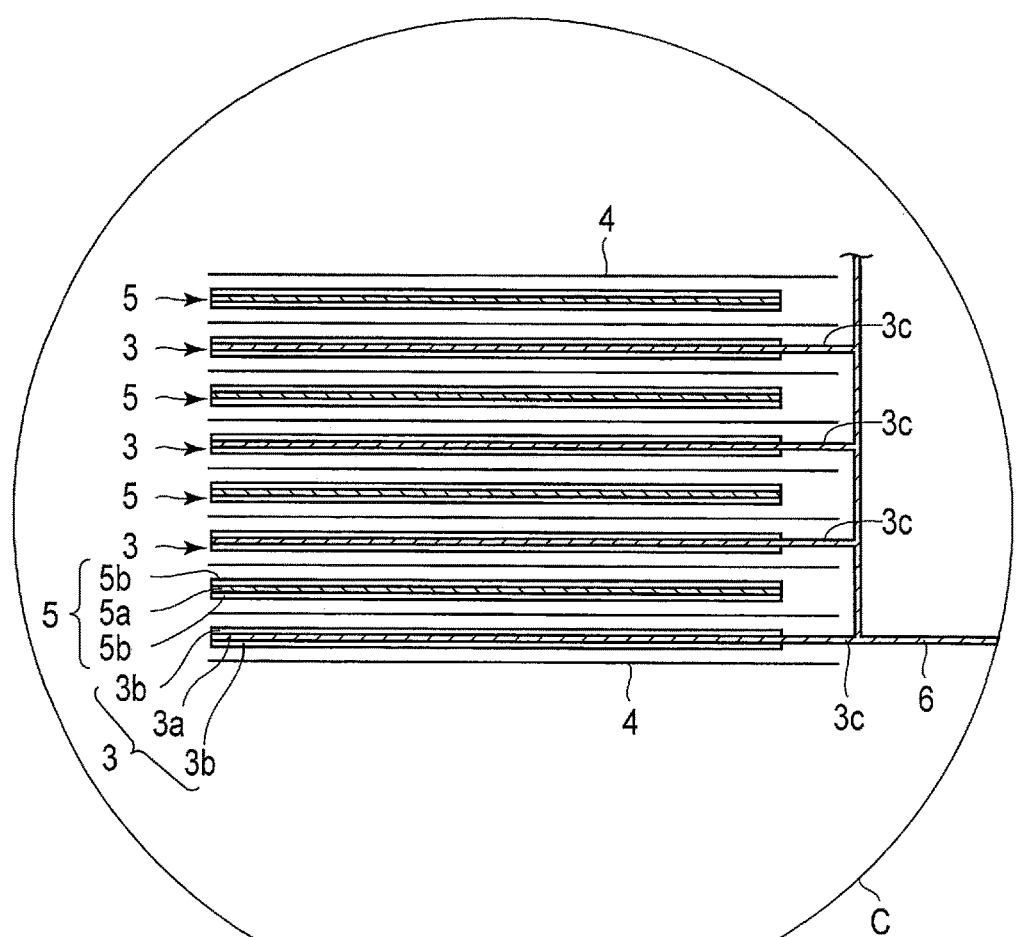
FIG. 5 is an enlarged cross-sectional view of section C of the secondary battery shown in FIG. 4.

The secondary battery according to the first embodiment is not limited to the secondary battery of the structure shown in FIGS. 1 and 2, and may be, for example, a battery of a structure shown in FIGS. 4 and 5.

FIG. 4 is a partially cut-out perspective view schematically showing another example of the secondary battery according to the first embodiment. FIG. 5 is an enlarged cross-sectional view of section C of the secondary battery shown in FIG. 4.

The secondary battery 100 shown in FIGS. 4 and 5 includes an electrode group 1 shown in FIGS. 4 and 5, a container member 2 shown in FIG. 4, and an electrolyte, which is not shown. The electrode group 1 and electrolyte are housed in the container member 2. The electrolyte is held in the electrode group 1.

The container member 2 is made of a laminate film including two resin layers and a metal layer sandwiched between the resin layers.

As shown in FIG. 5, the electrode group 1 is a stacked electrode group. The stacked electrode group 1 has a structure in which negative electrodes 3 and positive electrodes 5 are alternately stacked with separator(s) 4 sandwiched therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at one end, a portion 3c where the negative electrode active material-containing layer 3b is not supported on either surface. This portion 3c serves as a negative electrode tab. As shown in FIG. 5, the portions 3c serving as the negative electrode tabs do not overlap the positive electrodes 5. The plural negative electrode tabs (portions 3c) are electrically connected to the strip-shaped negative electrode terminal 6. A tip of the strip-shaped negative electrode terminal 6 is drawn to the outside from the container member 2.

Although not shown, the positive electrode current collector 5a of each of the positive electrodes 5 includes at one end, a portion where the positive electrode active material-containing layer 5b is not supported on either surface. This portion serves as a positive electrode tab. Like the negative electrode tabs (portion 3c), the positive electrode tabs do not overlap the negative electrodes 3. Further, the positive electrode tabs are located on the opposite side of the electrode group 1 with respect to the negative electrode tabs (portion 3c). The positive electrode tabs are electrically connected to the strip-shaped positive electrode terminal 7. A tip of the strip-shaped positive electrode terminal 7 is located on the opposite side relative to the negative electrode terminal 6 and drawn to the outside from the container member 2.

<Production Method>

The method for producing the above secondary battery will be described.

A positive electrode and a negative electrode are produced in the manner described above. The positive electrode and the negative electrode are used to produce an electrode group. For example, the positive electrode and negative electrode are stacked with a separator interposed therebetween, whereby a stacked electrode group can be obtained. Alternatively, the stack obtained by stacking the positive electrode and negative electrode with the separator interposed therebetween may be wound, whereby a wound electrode group can be obtained. Further, the wound electrode group may be pressed, whereby a wound electrode group of a flat shape can be obtained.

A liquid electrolyte is prepared. A gelling agent is added to the liquid electrolyte, thereby preparing an electrolyte precursor solution. As the gelling agent, for example, the polymeric material described above may be used.

The electrode group is impregnated with the electrolyte precursor solution. The gelling agent is polymerized through, for example, heating, thereby obtaining a gelled electrolyte. Upon gelling, by having the polymerization progress under a condition where there is much volume contraction of the gelling agent, the gel polymer portion and the liquid portion are more likely to become distinguishable from each other. In addition, the greater the volume contraction rate of the gelling agent is, the more likely the gel polymer portion will concentrate toward the electrode surface, which makes it possible to increase the amount of the liquid portion filling the electrode interior on the side of the current collector.

By appropriately selecting the gelling agent, the gel-part ratio of the resultant gel polymer portion can be adjusted. For example, when a gelling agent that includes a monomer unit having a high capability of crosslinking is used, the gel-part ratio is more likely to be high.

The above-described first ratio r1 and second ratio r2 can be controlled by adjusting the amount of the gelling agent added. The more the gelling agent, the lower the first ratio r1 and the second ratio r2 tend to be. Also, the first ratio r1 and the second ratio r2 are affected by the degree of polymerization of the gelling agent. For example, the more the amount of acidic group included in the gelling agent, the lower each value tends to be. In addition, the fabrication conditions for each electrode and polymerization conditions affect the first ratio r1 and the second ratio r2.

A secondary battery can be obtained by gelling the electrolyte in a state where the electrode group is housed in the container member. Alternatively, after gelling of the electrolyte, the electrode group impregnated with the gel electrolyte and the electrolytic solution may be housed in the container member to obtain the secondary battery.

<Measurement Method>

Measurement methods concerning the secondary battery will be described. To be more specific, a method for measuring the gel-part ratio of the gel polymer portion included in the electrolyte, and a method for determining the first ratio r1 and the second ratio r2 of the liquid portions to the gel polymer portions of the electrolytes respectively in the positive electrode active material-containing layer and negative electrode active material-containing layer will be described.

For the measurement, the secondary battery is discharged and then disassembled. The disassembling of the battery is performed, for example, in a glovebox put in an inert atmosphere, such as that of argon.

(Method for Measuring Gel-Part Ratio)

The gel-part ratio of the gel polymer portion of the electrolyte can be measured through the following procedure.

From the disassembled secondary battery, the gel electrolyte (the gel polymer portion of the electrolyte) of the separator portion is sampled. For example, the gel electrolyte is sampled together with the separator. When the battery does not include a separator, for example, the gel electrolyte positioned in a space between the positive electrode and the negative electrode is sampled.

Xylene, which is a deleterious substance and an organic solvent, is heated to a temperature of 110° C. The sampled gel electrolyte is kept immersed in the heated xylene for 24 hours. Subsequently, the sample is taken out and dried at a temperature of 100° C. with a degree of vacuum of 1.3 kPa or less for 24 hours.

Here, using the dried sample, a mass $M_{dry}$ of the gel electrolyte is measured. Taking the mass of the polymeric sample before immersing in xylene as $M_{wet}$, the degree of crosslinking is expressed as the ratio $M_{dry}/M_{wet}$ between $M_{wet}$ and $M_{dry}$, which is the "gel-part ratio". That is, defining a portion that remains without dissolving when the gel electrolyte is dissolved in the solvent as gel (a crosslinking portion remains as gel), and taking the ratio (percentage) of the mass of this gel portion to the mass before the dissolution in the solvent as the "gel-part ratio", the degree of the progress of crosslinking is evaluated.

(Method for Calculating First Ratio r1 and Second Ratio r2)

The battery is disassembled to take out an electrode. The liquid portion of the electrolyte is washed out from the obtained electrode using, for example, diethyl carbonate. The electrode obtained from such washing is dried under reduced pressure.

A sample having a size of about 50 mm×50 mm is cut out from the dried electrode. This sample is folded and taken in a measurement cell, and is subjected to measurement under conditions of an initial pressure of 5 kPa (about 0.7 psia, which corresponds to a pore diameter of about 250 μm) and a terminal pressure of about 60 thousand psia (which corresponds to a pore diameter of about 0.003 μm).

For example, Autopore 9520, manufactured by Shimadzu Corporation can be used as the measurement device of the pore diameter distribution. It is possible to obtain a volume of pores, and a mode diameter and a median diameter of gaps from the pore diameter distribution according to mercury porosimetry.

Incidentally, the principle utilized in analysis by mercury porosimetry is based on the Washburn equation of Formula (1).

$$D = -4\gamma \cos \theta / P \quad \text{Formula (1)}$$

Herein, P indicates pressure, D indicates pore diameter, $\gamma$ indicates surface tension (480 dyne·cm$^{-1}$) of mercury, and $\theta$ indicates a contact angle between mercury and a pore wall surface, which is, 140°. Since $\gamma$ and $\theta$ are constants, the relation between the applied pressure P and the pore diameter D is obtained from Washburn's equation, and the pore diameter and volume distribution can thus be derived by measuring the volume of intruded mercury at that time.

In the electrode washed and dried under reduced pressure in the manner described above, the gel polymer portion remains at the portions impregnated with the gel polymer portion in the electrode. Based on this, subsequently, the amount of the liquid portion impregnated in the electrode per unit area can be determined from the volume of the vacancy calculated through mercury porosimetry. At that time, a filling factor of the active material-containing layer can also be calculated. To be more specific, the cross section of the obtained electrode is observed with a scanning electron microscope (SEM), and a vacancy ratio per unit area can be calculated from a thickness of the active material-containing layer obtained from the SEM image of the cross section. The amount of the liquid portion, obtained earlier, is subtracted from the vacancy ratio, whereby the amount of the impregnated gel polymer portion can be estimated.

In the manner described above, the ratio (liquid portion/gel polymer portion) of the liquid portion to the gel polymer portion for each of the positive electrode and the negative electrode are determined. The first ratio r1 on the positive electrode side and the second ratio r2 on the negative electrode side thus can be obtained.

(Method for Examining Distribution of Gel Polymer Portion and Liquid Portion)

In a manner described below, the distribution of the gel polymer portion and the liquid portion in the electrolyte can be examined for the positive electrode active material-containing layer and the negative electrode active material-containing layer. To be more specific, in the electrode active material-containing layer, when the side of the interface between the active material-containing layer and the current collector is compared with the side of the surface of the active material-containing layer, it can be examined whether the amount of the liquid portion on the side of the interface to the current collector is greater or less.

In a manner similar to the above-described calculation method for the first ratio r1 and the second ratio r2, the electrode taken out from the disassembled secondary battery is washed and dried under reduced pressure. The active material-containing layer is cut such that the section parallel to the current collector can be obtained at the central position in a thickness direction of the active material-containing layer.

From each of the thus-obtained halves of the active material-containing layer, a sample with a size of about 50 mm×50 mm is cut out; and using these samples, the amount of the liquid portion per unit area impregnated in each sample is determined through the above-described mercury porosimetry. The amount of the liquid portion included in the half on the current collector side and the amount of the liquid portion included in the other half each can thus be determined.

The secondary battery according to the first embodiment includes a positive electrode, a negative electrode, and an electrolyte. The positive electrode includes a positive electrode current collector, and a positive electrode active material-containing layer thereon. The positive electrode active material-containing layer has first vacancies. The negative electrode includes a negative electrode current collector, and a negative electrode active material-containing layer thereon. The negative electrode active material-containing layer has second vacancies. The electrolyte includes a gel polymer portion and a liquid portion. A gel-part ratio of the gel polymer portion is 20% to 80%. The electrolyte is at least partially held in the first vacancies of the positive electrode active material-containing layer and the second vacancies of the negative electrode active material-containing layer. A first ratio r1 of a proportion of the liquid portion with respect to a proportion of the gel polymer portion of the electrolyte in the first vacancies is within a range of $0.01 \leq r1 \leq 10$. A second ratio r2 of a proportion of the liquid portion with respect to a proportion of the gel polymer portion of the electrolyte in the second vacancies is within a range of $0.01 \leq r2 \leq 10$. The secondary battery can exhibit excellent life performance and output performance.

[Second Embodiment]

According to a second embodiment, a battery module is provided. The battery module according to the second embodiment includes plural of secondary batteries according to the first embodiment.

In the battery module according to the second embodiment, each of the single-batteries may be arranged to be electrically connected in series or in parallel, or may be arranged in combination of in-series connection and in-parallel connection.

An example of the battery module according to the second embodiment will be described next, with reference to the drawings.

FIG. 6 is a perspective view schematically showing an example of the battery module according to the second embodiment. The battery module 200 shown in FIG. 6 includes five single-batteries 100a to 100e, four bus bars 21, a positive electrode-side lead 22, and a negative electrode-side lead 23. Each of the five single-batteries 100a to 100e is the secondary battery according to the first embodiment.

The bus bar 21 connects, for example, a negative electrode terminal 6 of one single-battery 100a and a positive electrode terminal 7 of the single-battery 100b positioned adjacent. In such a manner, five single-batteries 100 are thus connected in series by the four bus bars 21. That is, the battery module 200 shown in FIG. 6 is a battery module of five-in-series connection. Although no example is depicted in drawing, in a battery module including plural single-batteries that are electrically connected in parallel, for example, the plural single-batteries may be electrically connected by having plural negative electrode terminals being connected to each other by bus bars while having plural positive electrode terminals being connected to each other by bus bars.

The positive electrode terminal 7 of at least one battery among the five single-batteries 100a to 100e is electrically connected to the positive electrode-side lead 22 for external connection. In addition, the negative electrode terminal 6 of at least one battery among the five single-batteries 100a to 100e is electrically connected to the negative electrode-side lead 23 for external connection.

The battery module according to the second embodiment includes the secondary battery according to the first embodiment. Therefore, the battery module can exhibit excellent life performance and output performance.

[Third Embodiment]

According to a third embodiment, a battery pack is provided. The battery pack includes a battery module according to the second embodiment. The battery pack may include a single secondary battery according to the first embodiment, in place of the battery module according to the second embodiment.

The battery pack according to the third embodiment may further include a protective circuit. The protective circuit has a function to control charging and discharging of the secondary battery. Alternatively, a circuit included in equipment where the battery pack serves as a power source (for example, electronic devices, automobiles, and the like) may be used as the protective circuit for the battery pack.

Moreover, the battery pack according to the third embodiment may further include an external power distribution terminal. The external power distribution terminal is configured to externally output current from the secondary battery, and/or to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the third embodiment will be described with reference to the drawings.

Figure 7:
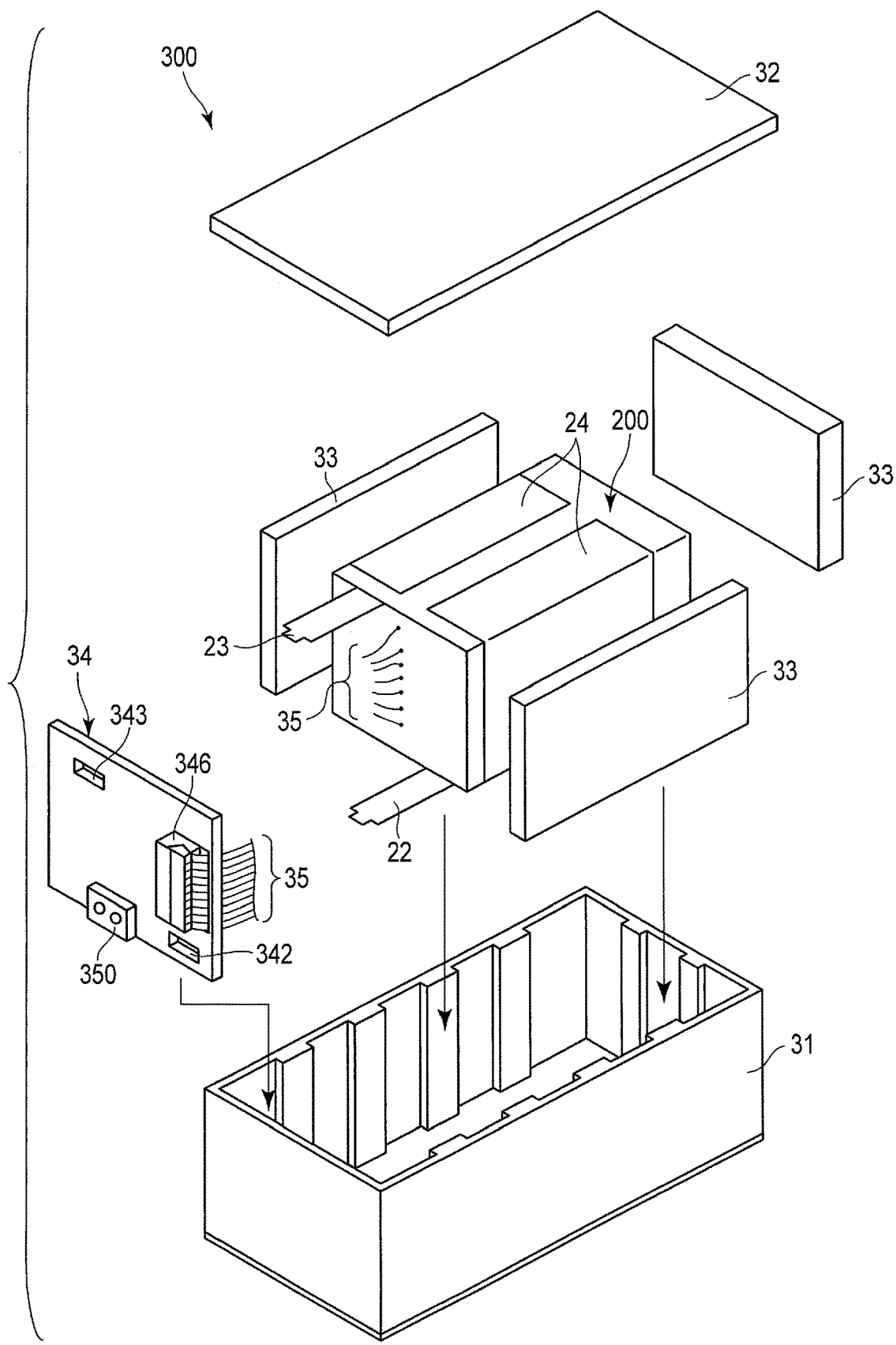
FIG. 7 is an exploded perspective view schematically showing an example of a battery pack according to an embodiment.
Figure 8:
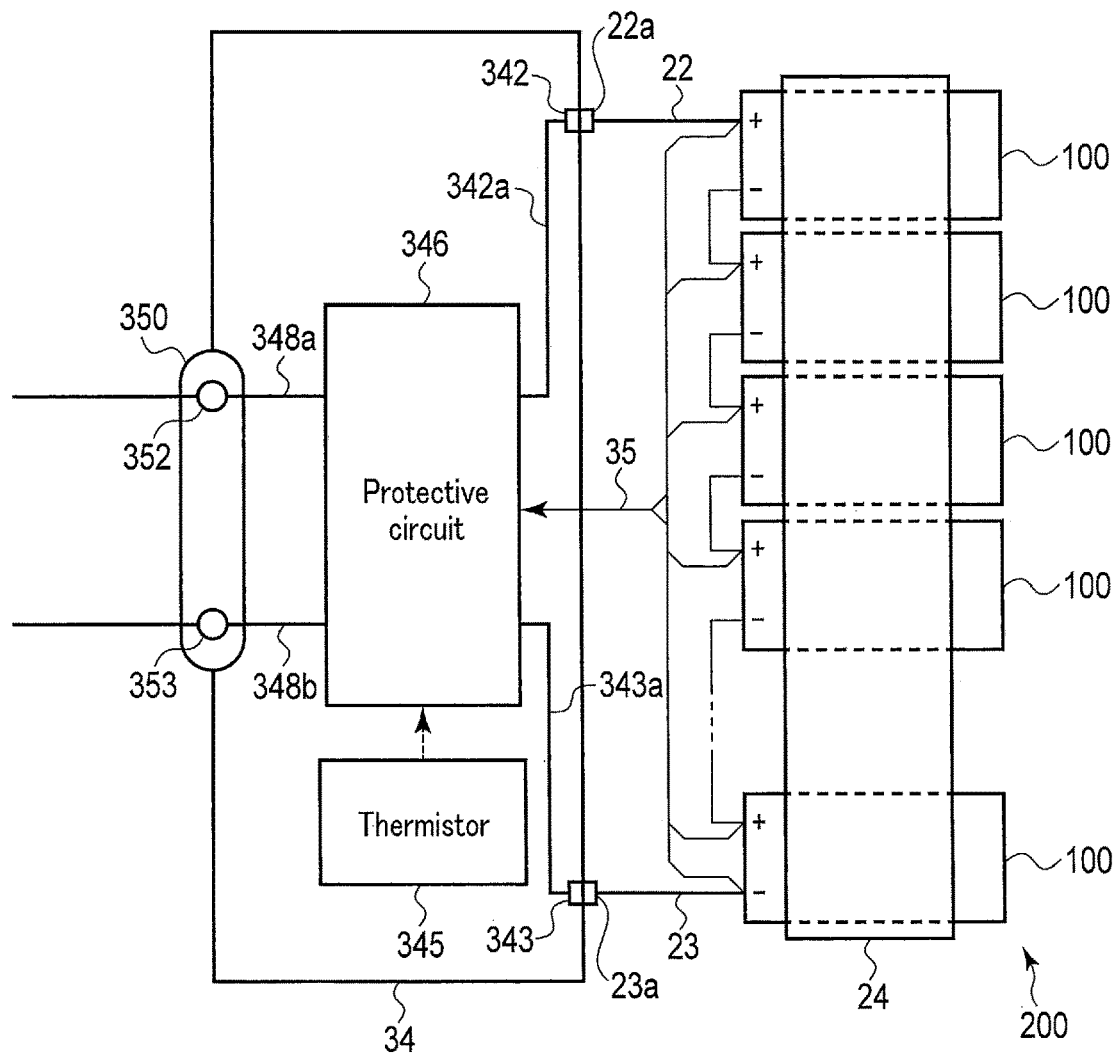
FIG. 8 is a block diagram showing an example of an electric circuit of the battery pack shown in FIG. 7.

FIG. 7 is an exploded perspective view schematically showing an example of the battery pack according to the third embodiment. FIG. 8 is a block diagram showing an example of an electric circuit of the battery pack shown in FIG. 7.

A battery pack 300 shown in FIGS. 7 and 8 includes a housing container 31, a lid 32, protective sheets 33, a battery module 200, a printed wiring board 34, wires 35, and an insulating plate (not shown).

The housing container 31 shown in FIG. 7 is a square bottomed container having a rectangular bottom surface. The housing container 31 is configured to be capable of housing the protective sheets 33, the battery module 200, the printed wiring board 34, and the wires 35. The lid 32 has a rectangular shape. The lid 32 covers the housing container 31 to house the battery module 200 and such. Although not illustrated, the housing container 31 and the lid 32 are provided with openings, connection terminals, or the like for connection to an external device or the like.

The battery module 200 includes plural single-batteries 100, a positive electrode-side lead 22, a negative electrode-side lead 23, and adhesive tape(s) 24.

At least one of the plural single-batteries 100 is a secondary battery according to the first embodiment. The plural single-batteries 100 are electrically connected in series, as shown in FIG. 8. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat shrinkable tape in place of the adhesive tape(s) 24. In this case, protective sheets 33 are arranged on both side surfaces of the battery module 200, and the heat shrinkable tape is wound around the battery module 200 and protective sheets 33. After that, the heat shrinkable tape is shrunk by heating to bundle the plural single-batteries 100.

One end of the positive electrode-side lead 22 is connected to the battery module 200. The one end of the positive electrode-side lead 22 is electrically connected to the positive electrode(s) of one or more single-battery 100. One end of the negative electrode-side lead 23 is connected to the battery module 200. The one end of the negative electrode-side lead 23 is electrically connected to the negative electrode (s) of one or more single-battery 100.

The printed wiring board 34 is provided along one face in the short side direction among the inner surfaces of the housing container 31. The printed wiring board 34 includes a positive electrode-side connector 342, a negative electrode-side connector 343, a thermistor 345, a protective circuit 346, wirings 342a and 343a, an external power distribution terminal 350, a plus-side wiring (positive-side wiring) 348a, and a minus-side wiring (negative-side wiring) 348b. One principal surface of the printed wiring board 34 faces one side surface of the battery module 200. An insulating plate (not shown) is disposed in between the printed wiring board 34 and the battery module 200.

The other end 22a of the positive electrode-side lead 22 is electrically connected to the positive electrode-side connector 342. The other end 23a of the negative electrode-side lead 23 is electrically connected to the negative electrode-side connector 343.

The thermistor 345 is fixed to one principal surface of the printed wiring board 34. The thermistor 345 detects the temperature of each single-battery 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive-side terminal 352 and a negative-side terminal 353.

The protective circuit 346 is fixed to the other principal surface of the printed wiring board 34. The protective circuit 346 is connected to the positive-side terminal 352 via the plus-side wiring 348a. The protective circuit 346 is connected to the negative-side terminal 353 via the minus-side wiring 348b. In addition, the protective circuit 346 is electrically connected to the positive electrode-side connector 342 via the wiring 342a. The protective circuit 346 is electrically connected to the negative electrode-side connector 343 via the wiring 343a. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction facing the printed wiring board 34 across the battery module 200. The protective sheets 33 are made of, for example, resin or rubber.

The protective circuit 346 controls charge and discharge of the plural single-batteries 100. The protective circuit 346 is also configured to cutoff electric connection between the protective circuit 346 and the external power distribution terminal 350 (positive-side terminal 352, negative-side terminal 353) to external device(s), based on detection signals transmitted from the thermistor 345 or detection signals transmitted from each single-battery 100 or the battery module 200.

An example of the detection signal transmitted from the thermistor 345 is a signal indicating that the temperature of the single-battery(s) 100 is detected to be a predetermined temperature or more. An example of the detection signal transmitted from each single-battery 100 or the battery module 200 include a signal indicating detection of overcharge, over-discharge, and overcurrent of the single-battery(s) 100. When detecting over charge or the like for each of the single batteries 100, the battery voltage may be detected, or a positive electrode potential or negative electrode potential may be detected. In the latter case, a lithium electrode to be used as a reference electrode is inserted into each single battery 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of the vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may respectively be used as the positive-side terminal and negative-side terminal of the external power distribution terminal.

Such a battery pack is used, for example, in applications where excellent cycle performance is demanded when a large current is extracted. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the third embodiment is provided with the secondary battery according to the first embodiment or the battery module according to the second embodiment. Accordingly, the battery pack can exhibit excellent life performance and output performance.

[Fourth Embodiment]

According to a fourth embodiment, a vehicle is provided. The battery pack according to the third embodiment is installed on this vehicle.

In the vehicle according to the fourth embodiment, the battery pack is configured, for example, to recover regenerative energy from motive force of the vehicle. The vehicle may include a mechanism (e.g., a regenerator) configured to convert kinetic energy of the vehicle into regenerative energy.

Examples of the vehicle according to the fourth embodiment include two-wheeled to four-wheeled hybrid electric automobiles, two-wheeled to four-wheeled electric automobiles, electrically assisted bicycles, and railway cars.

In the vehicle according to the fourth embodiment, the installing position of the battery pack is not particularly limited. For example, when installing the battery pack on an automobile, the battery pack may be installed in the engine compartment of the automobile, in rear parts of the vehicle body, or under seats.

The vehicle according to the fourth embodiment may have plural battery packs installed. In such a case, batteries included in each of the battery packs may be electrically connected to each other in series, electrically connected in parallel, or electrically connected in a combination of in-series connection and in-parallel connection. For example, in a case where each battery pack includes a battery module, the battery modules may be electrically connected to each other in series, electrically connected in parallel, or electrically connected in a combination of in-series connection and in-parallel connection. Alternatively, in a case where each battery pack includes a single battery, each of the batteries may be electrically connected to each other in series, electrically connected in parallel, or electrically connected in a combination of in-series connection and in-parallel connection.

An example of the vehicle according to the fourth embodiment is explained below, with reference to the drawings.

Figure 9:
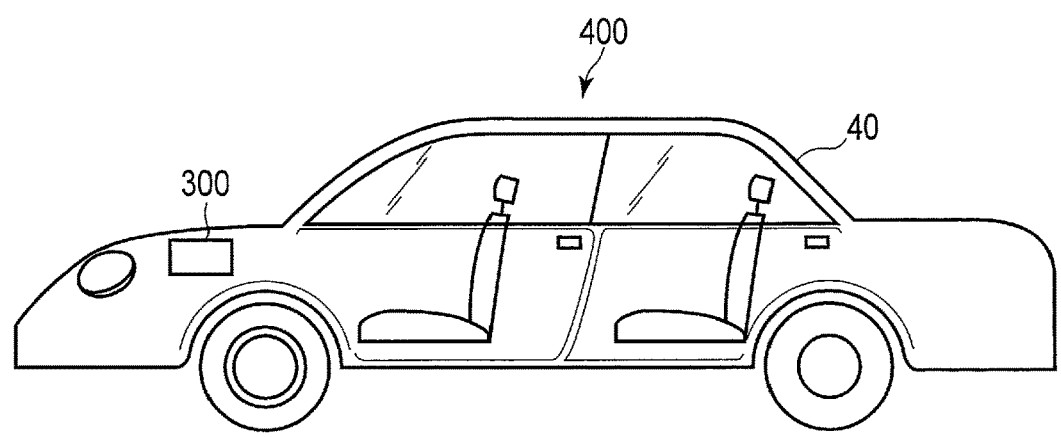
FIG. 9 is a partially see-through diagram schematically showing an example of a vehicle according to an embodiment.

FIG. 9 is a partially see-through diagram schematically showing an example of a vehicle according to the fourth embodiment.

A vehicle 400, shown in FIG. 9 includes a vehicle body 40 and a battery pack 300 according to the third embodiment. In the example shown in FIG. 9, the vehicle 400 is a four-wheeled automobile.

This vehicle 400 may have plural battery packs 300 installed. In such a case, the batteries (e.g., single-batteries or battery module) included in the battery packs 300 may be connected in series, connected in parallel, or connected in a combination of in-series connection and in-parallel connection.

In FIG. 9, depicted is an example where the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Next, with reference to FIG. 10, an aspect of operation of the vehicle according to the fourth embodiment is explained.

FIG. 10 is a diagram schematically showing an example of a control system related to an electric system in the vehicle according to the fourth embodiment. A vehicle 400, shown in FIG. 10, is an electric automobile.

The vehicle 400, shown in FIG. 10, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 10, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The battery pack 300a includes a battery module 200a and a battery module monitoring unit 301a (e.g., a VTM: voltage temperature monitoring). The battery pack 300b includes a battery module 200b and a battery module monitoring unit 301b. The battery pack 300c includes a battery module 200c and a battery module monitoring unit 301c. The battery packs 300a to 300c are battery packs similar to the aforementioned battery pack 300, and the battery modules 200a to 200c are battery modules similar to the aforementioned battery module 200. The battery modules 200a to 200c are electrically connected in series. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the first embodiment. The battery modules 200a to 200c each perform charging and discharging via a positive electrode terminal 413 and a negative electrode terminal 414.

The battery management unit 411 performs communication with the battery module monitoring units 301a to 301c and collects information such as voltages or temperatures for each of the single-batteries 100 included in the battery modules 200a to 200c included in the vehicle power source 41. In this manner, the battery management unit 411 collects information concerning security of the vehicle power source 41.

The battery management unit 411 and the battery module monitoring units 301a to 301c are connected via the communication bus 412. In the communication bus 412, a set of communication lines is shared at multiple nodes (i.e., the battery management unit 411 and one or more battery module monitoring units 301a to 301c). The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 10) for switching on and off electrical connection between the positive electrode terminal 413 and the negative electrode terminal 414. The switch unit 415 includes a precharge switch (not shown), which is turned on when the battery modules 200a to 200c are charged, and a main switch (not shown), which is turned on when output from the battery modules 200a to 200c is supplied to a load. The precharge switch and the main switch each include a relay circuit (not shown), which is switched on or off based on a signal provided to a coil disposed near the switch elements. The magnetic contactor such as the switch unit 415 is controlled based on control signals from the battery management unit 411 or the vehicle ECU 42, which controls the operation of the entire vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management unit 411 or the vehicle ECU 42, which controls the entire operation of the vehicle. Due to the inverter 44 being controlled, output voltage from the inverter 44 is adjusted.

The drive motor 45 is rotated by electric power supplied from the inverter 44. The drive generated by rotation of the motor 45 is transferred to an axle and driving wheels W via a differential gear unit, for example.

The vehicle 400 also includes a regenerative brake mechanism (a regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connecting line L1 is connected to the negative electrode terminal 414 of the vehicle power source 41. The other terminal of the connecting line L1 is connected to a negative electrode input terminal 417 of the inverter 44. A current detector (current detecting circuit) 416 in the battery management unit 411 is provided on the connecting line L1 in between the negative electrode terminal 414 and negative electrode input terminal 417.

One terminal of a connecting line L2 is connected to the positive electrode terminal 413 of the vehicle power source 41. The other terminal of the connecting line L2 is connected to a positive electrode input terminal 418 of the inverter 44. The switch unit 415 is provided on the connecting line L2 in between the positive electrode terminal 413 and the positive electrode input terminal 418.

The external terminal 43 is connected to the battery management unit 411. The external terminal 43 is able to connect, for example, to an external power source.

The vehicle ECU 42 performs cooperative control of the vehicle power source 41, switch unit 415, inverter 44, and the like, together with other management units and control units including the battery management unit 411 in response to inputs operated by a driver or the like. Through the cooperative control by the vehicle ECU 42 and the like, output of electric power from the vehicle power source 41, charging of the vehicle power source 41, and the like are controlled, thereby performing the management of the whole vehicle 400. Data concerning the security of the vehicle power source 41, such as a remaining capacity of the vehicle power source 41, are transferred between the battery management unit 411 and the vehicle ECU 42 via communication lines.

The vehicle according to the fourth embodiment is installed with the battery pack according to the third embodiment. Thus, the vehicle can exhibit high performance and reliability.

EXAMPLES

Examples will be described below; however, the embodiment is not limited to these examples.

Example 1

<Fabrication of Positive Electrode>

90% by mass of $LiNi_{0.5}Co_{0.2}Mn_{0.3}O_2$ composite oxide including primary particles having an average particle size of 0.002 mm as positive electrode active material, 5% by mass of graphite powder as electro-conductive agent, and 5% by mass of PVdF as binder were blended and dispersed in a N-methyl-2-pyrrolidone (NMP) solvent to prepare a slurry for forming an active material-containing layer. The above blending amounts are respectively in terms of weight with respect to the weight of the positive electrode active material-containing layer. The prepared slurry was applied onto both of reverse surfaces of an aluminum alloy foil (99.3% purity) having a thickness of 15 μm, and dried to obtain a pre-press positive electrode. The pre-press positive electrode was pressed to fabricate a positive electrode with the positive electrode active material-containing layer having a thickness of 40 μm.

<Fabrication of Negative Electrode>

$Li_4Ti_5O_{12}$ particles having an average particle size of 0.6 μm and a specific surface of 10 m²/g as negative electrode active material, graphite powder having an average particle size of 6 μm as electro-conductive agent, and PVdF as binder were blended in a mass ratio of 95:3:2 and dispersed in a N-methyl-2-pyrrolidone (NMP) solvent. This dispersion was stirred using a ball mill (with a rotational speed of 1000 rpm) for a stirring time of two hours to prepare a slurry. The obtained slurry was applied onto both of reverse surfaces of an aluminum alloy foil (99.3% purity) having a thickness of 15 μm, dried, and heat-pressed to fabricate a negative electrode. The fabricated negative electrode had a negative electrode active material-containing layer having a thickness of 59 μm on each surface and an electrode density of 2.2 g/cm³. In addition, this negative electrode had a negative electrode porosity of 35%, excluding the current collector.

<Preparation of Electrolyte>

Propylene carbonate and diethyl carbonate were mixed at a volume ratio of 1:2 to prepare a solvent mixture. Next, 1.2 M of $LiPF_6$ was dissolved in this solvent mixture, and 2% by mass of a polyacrylonitrile (PAN) polymer was added thereto as a gelling agent. Here, the gelling agent as used had such a composition with which a gel polymer portion would have a gel-part ratio of 30% upon gelling. Thereby, an electrolyte precursor solution was prepared.

<Fabrication of Secondary Battery>

The positive electrode obtained above, a separator that is a nonwoven fabric having a thickness of 20 μm, and the negative electrode were stacked such that the positive electrode active material-containing layer faces the negative electrode active material-containing layer with the separator interposed therebetween, to obtain a stack. Next, this stack was spirally wound such that the negative electrode was positioned at the outermost periphery, to produce an electrode group. This electrode group was heat-pressed at a temperature of 90° C., thereby producing a flat electrode group.

The obtained electrode group was housed in a thin metal can made of stainless steel having a thickness of 0.25 mm. Note that this metal can was equipped with a valve for leaking gas when the internal pressure is 2 atmospheres or more. The above electrolyte precursor solution was introduced into this metal can and impregnated into the above electrode group. The electrode group thus impregnated with the solution was heated at 60° C. for 25 hours, thereby gelling the electrolyte to fabricate a secondary battery. At that time, the first ratio r1 between the gel polymer portion and the liquid portion in the positive electrode was adjusted to 0.5, and the second ratio r2 between the gel polymer portion and the liquid portion in the negative electrode was adjusted to 0.7.

Example 2

A battery was fabricated by the same fabrication method as in Example 1, except that the electrode group was impregnated with an electrolyte precursor solution including 2% by mass of a PAN polymer as a gelling agent with such a composition with which a gel polymer portion would have a gel-part ratio of 50% upon gelling.

Example 3

A battery was fabricated by the same fabrication method as in Example 1, except that the electrode group was impregnated with an electrolyte precursor solution including 2% by mass of a PAN polymer as a gelling agent with such a composition with which a gel polymer portion would have a gel-part ratio of 80% upon gelling.

Example 4

A battery was fabricated by the same fabrication method as in Example 1, except that the electrode group was impregnated with an electrolyte precursor solution including 2% by mass of a PAN polymer as a gelling agent with such a composition with which a gel polymer portion would have a gel-part ratio of 20% upon gelling.

Examples 5 to 8

Batteries were fabricated by the same fabrication method as in Example 1, except that the content of the gelling agent in the electrolyte precursor solution was changed respectively to 1% by mass, 3% by mass, 4% by mass, and 5% by mass.

Example 9

A battery was fabricated by the same fabrication method as in Example 1, except that the ratios of the liquid portions to the gel polymer portions in the positive electrode and the negative electrode were adjusted respectively to a first ratio r1 of 0.2 and a second ratio r2 of 0.7.

Example 10

A battery was fabricated by the same fabrication method as in Example 1, except that the ratios of the liquid portions to the gel polymer portions in the positive electrode and the negative electrode were adjusted respectively to a first ratio r1 of 0.01 and a second ratio r2 of 0.7.

Example 11

A battery was fabricated by the same fabrication method as in Example 1 except that the ratios of the liquid portions to the gel polymer portions in the positive electrode and the negative electrode were adjusted respectively to a first ratio r1 of 1 and a second ratio r2 of 0.7.

Example 12

A battery was fabricated by the same fabrication method as in Example 1 except that the ratios of the liquid portions to the gel polymer portions in the positive electrode and the negative electrode were adjusted respectively to a first ratio r1 of 10 and a second ratio r2 of 0.7.

Example 13

A battery was fabricated by the same fabrication method as in Example 1 except that the ratios of the liquid portions to the gel polymer portions in the positive electrode and the negative electrode were adjusted respectively to a first ratio r1 of 0.5 and a second ratio r2 of 1.

Example 14

A battery was fabricated by the same fabrication method as in Example 1 except that the ratios of the liquid portions to the gel polymer portions in the positive electrode and the negative electrode were adjusted respectively to a first ratio r1 of 0.5 and a second ratio r2 of 10.

Example 15

A battery was fabricated by the same fabrication method as in Example 1 except that the ratios of the liquid portions to the gel polymer portions in the positive electrode and the negative electrode were adjusted respectively to a first ratio r1 of 0.5 and a second ratio r2 of 0.5.

Example 16

A battery was fabricated by the same fabrication method as in Example 1 except that the ratios of the liquid portions to the gel polymer portions in the positive electrode and the negative electrode were adjusted respectively to a first ratio r1 of 0.5 and a second ratio r2 of 0.1.

Example 17

A battery was fabricated by the same fabrication method as in Example 1 except that the ratios of the liquid portions to the gel polymer portions in the positive electrode and the negative electrode were adjusted respectively to a first ratio r1 of 0.5 and a second ratio r2 of 0.01.

Example 18

A battery was fabricated by the same fabrication method as in Example 1 except that the ratios of the liquid portions to the gel polymer portions in the positive electrode and the negative electrode were adjusted respectively to a first ratio r1 of 0.01 and a second ratio r2 of 0.01.

Example 19

A battery was fabricated by the same fabrication method as in Example 1 except that the ratios of the liquid portions to the gel polymer portions in the positive electrode and the negative electrode were adjusted respectively to a first ratio r1 of 10 and a second ratio r2 of 10.

Example 20

A battery was fabricated by the same fabrication method as in Example 1 except that the ratios of the liquid portions to the gel polymer portions in the positive electrode and the negative electrode were adjusted respectively to a first ratio r1 of 1 and a second ratio r2 of 1.

Example 21

A battery was fabricated by the same fabrication method as in Example 1 except that as the gelling agent, polymethyl methacrylate (PMMA) with such a composition with which a gel polymer portion would have a gel-part ratio of 30% upon gelling was used instead of PAN.

Example 22

A battery was fabricated by the same fabrication method as in Example 1 except that as the gelling agent, polyethylene oxide (PEO) with such a composition with which a gel polymer portion would have a gel-part ratio of 30% upon gelling was used instead of PAN.

Example 23

A battery was fabricated by the same fabrication method as in Example 1 except that as the gelling agent, polyvinylidene fluoride (PVdF) with such a composition with which a gel polymer portion would have a gel-part ratio of 30% upon gelling was used instead of PAN.

Comparative Example 1

A battery was fabricated by the same fabrication method as in Example 1 except that the electrode group was impregnated with an electrolyte precursor solution including 2% by mass of a PAN polymer as a gelling agent with such a composition with which a gel polymer portion would have a gel-part ratio of 5% upon gelling.

Comparative Example 2

A battery was fabricated by the same fabrication method as in Example 1 except that the electrode group was impregnated with an electrolyte precursor solution including 2% by mass of a PAN polymer as a gelling agent with such a composition with which a gel polymer portion would have a gel-part ratio of 10% upon gelling.

Comparative Example 3

A battery was fabricated by the same fabrication method as in Example 1 except that the ratios of the liquid portions to the gel polymer portions in the positive electrode and the negative electrode were adjusted respectively to a first ratio r1 of 0 and a second ratio r2 of 0.

Comparative Example 4

A battery was fabricated by the same fabrication method as in Example 1 except that the ratios of the liquid portions to the gel polymer portions in the positive electrode and the negative electrode were adjusted respectively to a first ratio r1 of 0.001 and a second ratio r2 of 0.001.

Comparative Example 5

A battery was fabricated by the same fabrication method as in Example 1 except that the ratios of the liquid portions to the gel polymer portions in the positive electrode and the negative electrode were adjusted respectively to a first ratio r1 of 100 and a second ratio r2 of 100.

Comparative Example 6

A battery was fabricated by the same fabrication method as in Example 1 except that the electrode group was impregnated with an electrolyte precursor solution including 2% by mass of a PAN polymer as a gelling agent with such a composition with which a gel polymer portion would have a gel-part ratio of 90% upon gelling.

<Examination of State of Electrolyte in Active Material-Containing Layer>

By the method explained earlier, the gel-part ratio of the gel polymer portion of the electrolyte, the first ratio r1 between the gel polymer portion and the liquid portion of the electrolyte in the first vacancies of the positive electrode active material-containing layer, and the second ratio r2 between the gel polymer portion and the liquid portion of the electrolyte in the second vacancies of the negative electrode active material-containing layer were determined for each of the secondary batteries produced in the above examples. The results are shown in Table 1 below.

Also, for each of the positive electrode and the negative electrode, the active material-containing layer was examined for the relationship in liquid portion amount between the current collector side and its opposite side, i.e., the side of the surface facing the separator, by the method explained earlier. In all of the secondary batteries other than the secondary battery of Comparative Example 3, the amount of the electrolytic solution portion per volume of electrode vacancy (first vacancies, second vacancies) was greater on the side of the interface with the current collector (first interface side, second interface side) than on the side of the surface close to the separator, in both the positive electrode and the negative electrode. For the secondary battery of Comparative Example 3, the electrolyte included in the electrode vacancies were occupied by the gel polymer portion across the entire active material-containing layers, in both the positive electrode and the negative electrode.

<Cycle Life Test>

A cycle life test was performed on each of the secondary batteries fabricated in the above examples under the following conditions. In each charge-discharge cycle, the battery was charged at a constant current of 1 A up to 2.8 V under a 45° C. environment, and thereafter, a resting period of 30 minutes was provided. Then, the battery was discharged at a constant current of 3 A to 1.5 V, and another resting period of 30 minutes was provided. Taking this series of operations as one charge-discharge cycle, the charge-discharge cycle was repeated until the 1000th cycle.

A ratio (percentage) of the capacity in the discharge at the 1000th cycle to the capacity in the discharge at the 1st cycle was calculated and recorded as a cycling capacity retention ratio (Cycling Capacity Retention Ratio=[(Discharge Capacity at 1000th Cycle/Discharge Capacity at 1st Cycle)× 100%]).

<Output Performance Test>

An output performance test was performed on each of the secondary batteries fabricated in the above examples under the following conditions. The battery was charged at 0.2 C up to 2.8 V under a 25° C. environment, and then discharged at 1 C to 1.5 V, in order to examine the battery capacity. Then, the battery was again charged at 0.2 C up to 2.8 V, and discharged at a discharge current of 5 C to examine the battery capacity. Regarding the discharge capacity at the 0.2 C discharge as 100%, and based on the discharge capacity at the 5 C discharge with respect to the discharge capacity at the 0.2 C discharge, a 5 C/0.2 C capacity retention ratio was calculated (5 C/0.2 C Capacity Retention Ratio=[(Capacity at 5 C Discharge/Capacity at 0.2 C Discharge)×100%]).

Table 1 summarizes the species and content of the gelling agent used for each of the secondary batteries of Examples 1 to 22 and Comparative Examples 1 to 3, the gel-part ratio of the gel polymer portion of the electrolyte, the proportion (first ratio r1 and second ratio r2) between the gel polymer portion and the liquid portion of the electrolyte included in the electrode vacancy (first vacancies and second vacancies) examined for each of the positive electrode and negative electrode, results of the cycle life test, as well as results of the output performance test. Shown as results of the cycle life test are capacity retention ratios upon performing 1000 cycles of charge and discharge under a 45° C. environment. Shown as results of the output performance are ratios (5 C/0.2 C Capacity Retention Ratios) of the discharge capacity at a 5 C rate to the discharge capacity at a 0.2 C rate.

TABLE 1

| | Gelling Agent Specie | Gelling Agent Content (mass %) | Gel-part Ratio (%) | First Ratio r1 of Positive Electrode | Second Ratio r2 of Negative Electrode | 1000 Cycle Capacity Retention Ratio at 45° C. (%) | 5C Discharge Capacity/ 0.2C Discharge Capacity (%) |
|---|---|---|---|---|---|---|---|
| Example 1 | PAN | 2 | 30 | 0.5 | 0.7 | 92 | 91 |
| Example 2 | PAN | 2 | 50 | 0.7 | 0.9 | 93 | 87 |
| Example 3 | PAN | 2 | 80 | 0.9 | 1.1 | 95 | 75 |
| Example 4 | PAN | 2 | 20 | 0.3 | 0.5 | 90 | 92 |
| Example 5 | PAN | 1 | 30 | 0.6 | 0.9 | 88 | 94 |
| Example 6 | PAN | 3 | 30 | 0.2 | 0.4 | 92 | 89 |
| Example 7 | PAN | 4 | 30 | 0.09 | 0.11 | 93 | 86 |
| Example 8 | PAN | 5 | 30 | 0.04 | 0.07 | 94 | 83 |
| Example 9 | PAN | 2 | 30 | 0.2 | 0.7 | 92 | 90 |
| Example 10 | PAN | 2 | 30 | 0.01 | 0.7 | 97 | 89 |
| Example 11 | PAN | 2 | 30 | 1 | 0.7 | 88 | 92 |
| Example 12 | PAN | 2 | 30 | 10 | 0.7 | 84 | 94 |
| Example 13 | PAN | 2 | 30 | 0.5 | 1 | 90 | 92 |
| Example 14 | PAN | 2 | 30 | 0.5 | 10 | 89 | 93 |
| Example 15 | PAN | 2 | 30 | 0.5 | 0.5 | 92 | 89 |
| Example 16 | PAN | 2 | 30 | 0.5 | 0.1 | 93 | 88 |
| Example 17 | PAN | 2 | 30 | 0.5 | 0.01 | 94 | 88 |
| Example 18 | PAN | 2 | 30 | 0.01 | 0.01 | 97 | 86 |
| Example 19 | PAN | 2 | 30 | 10 | 10 | 82 | 95 |
| Example 20 | PAN | 2 | 30 | 1 | 1 | 85 | 94 |
| Example 21 | PMMA | 2 | 30 | 0.5 | 0.7 | 93 | 90 |
| Example 22 | PEO | 2 | 30 | 0.5 | 0.7 | 90 | 91 |
| Example 23 | PVdF | 2 | 30 | 0.5 | 0.7 | 91 | 91 |
| Comparative Example 1 | PAN | 2 | 5 | 0.01 | 0.01 | 70 | 92 |
| Comparative Example 2 | PAN | 2 | 10 | 0.05 | 0.05 | 79 | 85 |
| Comparative Example 3 | PAN | 2 | 30 | 0 | 0 | 91 | 76 |
| Comparative Example 4 | PAN | 2 | 30 | 0.001 | 0.001 | 65 | 96 |
| Comparative Example 5 | PAN | 2 | 30 | 100 | 100 | 90 | 72 |
| Comparative Example 6 | PAN | 2 | 90 | 1 | 1 | 93 | 56 |

As shown in Table 1, the secondary batteries of Examples 1 to 22, for which the first ratio r1 in the positive electrode and the second ratio r2 in the negative electrode were each within a range of from 0.01 to 10, exhibited excellent life performance and output performance.

In contrast, Comparative Examples 1 and 2, for which the gel-part ratio of the gel polymer portion of the electrolyte was less than 20%, had a lower cycle life performance. It is inferred that Comparative Examples 1 and 2 had a lower durability performance towards high temperatures due to the lower degree of the gelation of their electrolyte. Comparative Example 6, for which the gel-part ratio of the gel polymer portion was greater than 80%, had lower output performance. It is inferred that Comparative Example 6 had an increased battery resistance due to the excessively gelled electrolyte.

Comparative Examples 3 and 4, for which the first ratio r1 and the second ratio r2 were less than 0.01, had a low output performance. It is inferred that for Comparative Examples 3 and 4, as a consequence of having the low proportion of electrolytic solution in the electrolyte held in the electrode, charge-discharge rate had decreased because of a decrease in lithium-ion diffusion due to the gel polymer portion. Comparative Example 5, for which the first ratio r1 and the second ratio r2 were greater than 10, had a lower cycle life performance. It is inferred that Comparative Example 5 had a lower durability performance towards high temperatures as a result of having a low proportion of the gel polymer portion in the electrolyte, namely, a low proportion of the gel electrolyte.

According to one or more embodiment and example described above, a secondary including a positive electrode, a negative electrode, and an electrolyte is provided. The positive electrode includes a positive electrode current collector, and positive electrode active material-containing layer(s) provided on the positive electrode current collector. The positive electrode active material-containing layer(s) has first vacancies. The negative electrode includes a negative electrode current collector, and negative electrode active material-containing layer(s) provided on the negative electrode current collector. The negative electrode active material-containing layer(s) has second vacancies. The electrolyte includes a gel polymer portion and a liquid portion. A gel-part ratio of the gel polymer portion of the electrolyte is within a range of 20% to 80%. At least a part of the electrolyte is held in the first vacancies and the second vacancies. A first ratio r1 of a proportion of the liquid portion with respect to a proportion of the gel polymer portion of the electrolyte in the first vacancies is within a range of $0.01 \leq r1 \leq 10$. A second ratio r2 of a proportion of the liquid portion with respect to a proportion of the gel polymer portion of the electrolyte in the second vacancies is within a range of $0.01 \leq r2 \leq 10$. The secondary battery can exhibit excellent life performance and output performance, and can provide a battery pack excellent in life performance and output performance and a vehicle having the battery pack installed thereon.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such embodiments or modifications as would fall within the scope and spirit of the inventions.

What is claimed is:

1. A secondary battery comprising:
    a positive electrode comprising a positive electrode current collector and a positive electrode active material-containing layer provided on the positive electrode current collector, the positive electrode active material-containing layer having first vacancies;
    a negative electrode comprising a negative electrode current collector and a negative electrode active material-containing layer provided on the negative electrode current collector, the negative electrode active material-containing layer having second vacancies; and
    an electrolyte comprising a gel polymer portion and a liquid portion, the gel polymer portion having a gel-part ratio within a range of from 20% to 80%,
    at least a part of the electrolyte being held in the first vacancies of the positive electrode active material-containing layer and the second vacancies of the negative electrode active material-containing layer,
    a first ratio r1 of a proportion of the liquid portion to a proportion of the gel polymer portion of the electrolyte in the first vacancies of the positive electrode active material-containing layer being within a range of $0.01 \leq r1 \leq 10$,
    a second ratio r2 of a proportion of the liquid portion to a proportion of the gel polymer portion of the electrolyte in the second vacancies of the negative electrode active material-containing layer being within a range of $0.01 \leq r2 \leq 10$, and
    the first ratio r1 and the second ratio r2 satisfying a relationship of $r1 \leq r2$.

2. The secondary battery according to claim 1, wherein in the positive electrode active material-containing layer, an amount of the liquid portion of the electrolyte on a side of a first interface between the positive electrode active material-containing layer and the positive electrode current collector is greater than an amount of the liquid portion on a side of a surface of the positive electrode active material-containing layer, and in the negative electrode active material-containing layer, an amount of the liquid portion of the electrolyte on a side of a second interface between the negative electrode active material-containing layer and the negative electrode current collector is greater than an amount of the liquid portion on a side of a surface of the negative electrode active material-containing layer.

3. A battery pack comprising the secondary battery according to claim 1.

4. The battery pack according to claim 3, further comprising an external power distribution terminal and a protective circuit.

5. The battery pack according to claim 3, comprising plural of the secondary battery, the secondary batteries being electrically connected in series, in parallel, or in combination of in-series connection and in-parallel connection.

6. A vehicle comprising the battery pack according to claim 3.

7. The vehicle according to claim 6, wherein the vehicle comprises a mechanism configured to convert kinetic energy of the vehicle into regenerative energy.

* * * * *